United States Patent Office 3,639,634
Patented Feb. 1, 1972

3,639,634
CARDIAC ANTIARRHYTHMIC METHOD AND COMPOSITION EMPLOYING ALKYLAMINO-ALKOXYHALOPHENOL COMPOUNDS
Franklin N. Marshall, Indianapolis, Ind., assignor to The Dow Chemical Company, Midland, Mich.
No Drawing. Filed Mar. 6, 1969, Ser. No. 804,983
Int. Cl. A61k 27/00
U.S. Cl. 424—330                  10 Claims

ABSTRACT OF THE DISCLOSURE

A method useful for alleviating cardiac arrhythmias such as tachycardias in animals by administering to arrhythmic animals an antiarrhythmic amount of an alkylaminoalkoxyhalophenol compound such as 3,5-dibromo-4-(2-dimethylaminoethoxy)phenol or a pharmaceutically-acceptable salt thereof.

SUMMARY OF THE INVENTION

This invention is concerned with a method and compositions for treating cardiac arrhythmias in animals and is particularly directed to a method and composition useful for treating arrhythmic animals, particularly mammals, by the administration thereto of an antiarrhythmic amount of a free base compound or pharmaceutically-acceptable salt of an alkylaminoalkoxyhalophenol compound corresponding to the formula

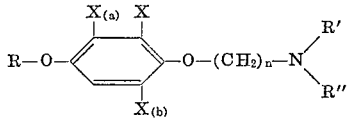

wherein R represents hydrogen or methyl, X represents chlorine or bromine, R' represents hydrogen, methyl, ethyl, propyl or butyl, R" represents methyl, ethyl, propyl or butyl, $n$ represents one of the integers 2, 3 and 4 and $a$ and $b$ each independently represent one of the integers zero and one.

It is an object of the invention to provide a method for the treatment of cardiac arrhythmias in animals. It is another object of the invention to provide novel compositions which can be employed to combat cardiac arrhythmias in mammals. It is a further object of the invention to provide pharmaceutical compositions comprising one or more antiarrhythmic compound of high potency. Further objects and advantages will become apparent upon consideration of the following specification and claims.

It has been found that alkylaminoalkoxyhalophenol compounds corresponding to the above Formula I and the pharmaceutically-acceptable salts thereof have powerful antiarrhythmic activity when administered to arrhythmic animals, and in particular, to arrhythmic mammals. As employed herein, the phrase "pharmaceutically-acceptable salts" refers to non-toxic acid addition salts of the active compounds, the anions of which are relatively innocuous to the animal at dosages consistent with good antiarrhythmic activity so that the beneficial effects of the free base are not vitiated by side effects ascribable to the anions. Appropriate pharmaceutically-acceptable salts include those derived from mineral acids such as hydrochloric, hydrobromic, sulfuric and nitric acid and from organic acids such as acetic, lactic, maleic, succinic, fumaric, glutaric, citric, maleic and tartaric acids and the like.

The alkylaminoalkoxyhalophenol compounds employed in the method and composition of the invention are crystalline solids which are soluble in a variety of organic solvents such as chlorinated hydrocarbons, chlorinated benzenes and alkylbenzenes and only slightly soluble in water. The pharmaceutically-acceptable salts of the compounds are crystalline solids which are soluble in water and slightly soluble in organic solvents such as halobenzenes, ether and alcohols. For the sake of convenience, the compounds will be hereinafter referred to as "substituted phenol compounds."

A preferred group of compounds for use in the method and composition of the invention includes those corresponding to Formula I wherein $a$ is zero when $b$ is zero. A further preferred group of compounds includes those wherein $a$ is zero and R' and R" both represent methyl. The compounds wherein both $a$ and $b$ are zero, wherein $n$ is two and wherein R' and R" both represent methyl have particularly long-lasting antiarrhythmic properties and are particularly preferred. The substituted phenol compounds are preferably employed in the form of their pharmaceutically-acceptable salts.

The substituted phenol compounds are prepared by the reaction of a substituted ω-bromoalkylphenol corresponding to Formula II with an alkylamine corresponding to Formula III.

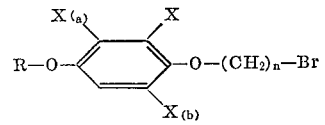

In the above Formulae II and III, R, X, R', R", $n$, $a$ and $b$ have the significance set out above with respect to Formula I. The substituted ω-bromoalkylphenols of Formula II are prepared in a procedure similar to that of White and Wysong, U.S. Pat. No. 3,389,171, by the reaction of a substituted 4-methoxyphenol or a substituted hydroquinone with an excess of alkylene dibromide such as ethylene dibromide, 1,3-dibromopropane or 1,4-dibromobutane in an aqueous or organic liquid reaction medium containing a hydrogen bromide acceptor such as an alkali metal hydroxide or carbonate. Representative starting materials corresponding to Formula II can be prepared by the reaction of a substituted 4-methoxyphenol or substituted hydroquinone such as 2-bromo-4-methoxyphenol,
2,3-dibromo-4-methoxyphenol,
2-chloro-4-methoxyphenol,
2,3,6-tribromo-4-methoxyphenol,
2-chloro-6-bromo-4-methoxyphenol,
2,3-dichloro-4-methoxyphenol,
2-bromohydroquinone,
2,6-dichlorohydroquinone,
2,3,6-tribromohydroquinone or the like with ethylene dibromide, 1,3-dibromopropane or 1,4-dibromobutane.

In a convenient procedure for the preparation of the substituted phenol compounds a substituted ω-bromoalkylphenol corresponding to Formula II is reacted with an excess of an alkylamine corresponding to Formula III in an inert organic such as methanol, ethanol or isopropanol as a reaction medium. The reaction proceeds when the reactants are contacted and mixed at a temperature of about 50° to 70° C. The reaction proceeds with the evolution of hydrogen bromide of reaction, and the use of at least a molar excess of alkylamine is preferred, the excess alkylamine serving as a hydrogen bromide acceptor. The reaction is generally complete in 10 to 100 hours, depending upon the temperature employed, and the product is obtained as the free base. The product can be separated by conventional procedures such as evaporation or extraction and can be purified by conventional procedures such as filtration, washing, or by recrystallization. The product can be employed directly in combatting arrhythmias, or it can be converted to a pharmaceutically-acceptable salt by treatment with an excess of an alcoholic or ethereal acid.

The pharmaceutically-acceptable salts of the substituted phenol compounds can be conveniently prepared by dissolving the substituted phenol-free base compound in an alcohol or ether and adding an excess of an alcoholic or ethereal solution of an acid such as hydrochloric acid, hydrobromic acid, acetic acid, tartaric acid, maleic acid or the like to precipitate the pharmaceutically-acceptable salt. The salt can be separated by filtration and purified by recrystallization. The free base substituted phenol compounds can be prepared by hydrolysis of the pharmaceutically-acceptable salts in aqueous base and can be separated by extraction with organic solvents and purified by recrystallization.

In accordance with the invention, an antiarrhythmic amount of a substituted phenol compound of the invention or a pharmaceutically-acceptable salt thereof is administered to an arrhythmic animal. The terms "arrhythmic" and arrhythmia" as employed herein refer to irregular cardiac activity characterized by irregular beating of the heart, that is, non-rhythmic heartbeat. Such arrhythmias involve substantial departures from the regular, substantially normal sinus heartbeat. Arrhythmias are generally far beyond the normal increased, but still substantially regular, heartbeat rate resulting from physical activity. The term is inclusive of the conditions described by terms such as ventricular fibrillation, ventricular tachycardia, atrioventricular nodal beats, auricular flutter, auricular fibrillation or premature ventricular contractions. The term "arrhythmic animal," as employed in the present specification and claims, means and refers to an animal suffering cardiac arrhythmias. Such arrhythmias can be the result of physiological or pathological conditions, can be brought about by physical conditions such as electrical stimulation or physical injury or they can be brought about by pharmacological effects such as the administration of compounds such as digitalis or similar compounds such as ouabain, acetyl strophanthidin, deslanatoside C or digitoxin; epinephrine; ergot; chloroform; cyclopropane and the like having cardiac stimulant and arrhythmia-inducing activity or side effects.

In the practice of the invention, one or more substituted phenol compound is normally incorporaed in a pharmaceutical carrier and the resulting composition is administered internally to an arrhythmic animal. In the present specification and claims, "pharmaceutical carrier" refers to known pharmaceutical excipients which are substantially non-toxic and non-sensitizing at dosage levels consistent with good antiarrhythmic activity. The active ingredient is preferably administered both parenterally in the form of liquid injectable solutions or suspensions, and orally in the form of liquid compositions or solid compositions. Suitable pharmaceutical carriers which can be employed for formulating the solid compositions such as for tablets or capsules include starch, lactose, glucose, sucrose, gelatin, powdered licorice, malt, rice flour, chalk, silica gel, hydroxyethyl cellulose, sodium alginate, hydroxypropyl cellulose, magnesium carbonate, magnesium stearate and the like and compatible mixtures thereof. The substituted phenol compounds can also be formulated as liquid compositions including syrups, elixirs, suspensions and emulsions for oral administration. Among the liquid pharmaceutical carriers which can be employed for orally-administered compositions are ethanol, water, saline, glucose syrup, syrup of acacia, mucilage of tragacanth, propylene glycol, polyethylene glycols, peanut oil, wheat germ oil, sunflower seed oil or corn oil and the like and compatible mixtures thereof. Orally-ingestible emulsions are prepared with the aid of emulsifying agents such as lecithin, sorbitan trioleate, polyoxyethylene sorbitan monooleate and natural gums such as gum acacia and gum tragacanth.

Suspensions are prepared with the aid of suspending agents such as polyethylene oxide condensation products of alkylphenols or fatty acids or fatty alcohols, or cellulose derivatives such as carboxymethyl cellulose or hydroxypropylmethyl cellulose. The compositions can also contain sweetening agents such as calcium cyclamate or calcium saccharin, flavoring agents such as caramel or licorice, coloring materials, preservatives and the like.

Injectable compositions adapated for parenteral administration such as intramuscular, subcutaneous or, preferably, intravenous injection can be prepared with carriers such as water, normal saline solutions, Ringer's Injection, Lactated Ringer's Injection, dextrose solutions, ethanol, propylene glycol, liquid polyethylene glycols, fixed vegetable oils such as corn oil, peanut oil or cottonseed oil, ethyl oleate, isopropyl myristate and the like. The injectable compositions can also contain other materials such as preservatives, buffers and the like. The selection of the exact pharmaceutical carrier to be employed in any given circumstance can be carried out by routine and conventional range finding operations to arrive at formulations having the desired characteristics of physical form, ease of administration in a desried route, storage stability, and the like.

The antiarrhythmic amount of the substituted phenol compound to be administered to an arrhythmic animal can vary depending upon such factors as the severity of the arrhythmia exhibited the cause of the arrhythmia, the method and frequency of administration, the exact compound employed, the exact antiarrhythmic effect to be produced and the species, size, weight, age and physical condition of the particular animal being treated. In general, when the animal is actively exhibiting arrhythmia, it is preferred to administer the substituted phenol compounds at an antiarrhythmic dosage rate sufficient to bring about a complete conversion of the arrhythmia to normal sinus cardiac activity. In such operations, the active compound is preferably introduced directly into the cardiovascular system of the animal to provide an antiarrhythmic concentration thereof in the blood sufficient to alleviate the arrhythmia. In a convenient procedure, the substituted phenol compound is administered by intravenous injection at an initial antiarrhythmic dosage less than that required to fully convert the arrhythmia to normal rhythm, and the heartbeat of the animal is monitored as the amount of compound administered is gradually increased over a period of minutes until an antiarrhythmic amount sufficient to fully convert the arrhythmia to rhythmic cardiac activity has been administered. It is then preferred to supply the substituted phenol compounds in periodic maintenance antiarrhythmic dosages, such administration being either by the same parenteral route, or by administration of larger antiarrhythmic dosages by another route such as by oral administration. The maintenance antiarrhythmic dosage and mode of administration are selected to provide a more-or-less continuous antiarrhythmic concentration of the substituted phenol compound in the cardiovascular system, such concentration being sufficient to inhibit further arrhythmia. In general, the mixed ether compound can be administered intravenously in initial dosages of from about 500 or less to about 10,000 or more micrograms per kilogram of animal body weight, providing antiarrhythmic concentrations in the cardiovascular system of about 40 or lower to about 800 or more micrograms per liter of blood. Maintenance dosages can vary widely depending upon a variety of factors such as the time and frequency of administration, the exact substituted phenol compound or compounds employed, the condition, size, age and species of the animal, the route of administration selected, the type of dosage form employed, the type and cause of the arrhythmia, and the length of time during which a maintenance dose is desired. In cases in which there is little or no likelihood of recurrence of arrhythmia once conversion has been brought about, the maintenance dosage can comprise a continuation of the initial intravenous antiarrhythmic dosage for a relatively brief period. Maintenance dosages can be administered by single or multiple doses provided that the compounds are administered in an amount sufficient to provide an antiarrhythmic concentration of active compound in the blood or to provide alleviation of cardiac arrhythmia. When the active ingredient is administered orally as in the form of tablets or capsules, it is preferred to employ compositions in dosage unit form containing the mixed compound in an amount between about 50 and about 200 milligrams per unit. When the active compounds are administered by procedures such as intravenous injection or infusion, it is preferred to employ sterile injectable liquid compositions in dosage unit form containing from about 10 to about 100 milligrams of the mixed ether compound per unit, the units comprising about 1 to about 10 milliliters of total liquid.

In general, the compositions of the invention contain from about 2 to about 95 percent of the mixed ether compound in a pharmaceutical carrier.

DESCRIPTION OF THE PREFERRED EMBODIMENTS

The following examples illustrate the invention but are not to be construed as limiting the same.

Example 1

$\beta$,2-dibromo-4-methoxyphenetole (15.5 grams, 0.05 mole) and 100 milliliters (0.485 mole of 4.85 normal dimethylamine in methanol are mixed together and the mixture is heated for 20 hours at a temperature of 60° C. The reaction mixture is concentrated to dryness by evaporation under reduced pressure and the residue is taken up in a mixture of water and methylene chloride. The methylene chloride layer is separated and concentrated under reduced pressure. The residue is dissolved in 50 milliliters of isopropanol and excess hydrogen bromide in isopropanol is added. The mixture is cooled for one hour and filtered. The 2 - (2-bromo-4-methoxyphenoxy)-N,N-dimethylethylamine hydrobromide product is obtained as a crystalline solid melting at 140°–141° C.

In substantially the same procedure, the following are prepared:

2-(2,6-dibromo - 4 - methoxyphenoxy)-N,N-dimethylethylamine hydrobromide, melting at 192°–193° C. is prepared by reacting $\beta$-2,6-tribromo - 4 - methoxyphenetole with diethylamine.

2-(2-bromo - 4 - methoxyphenoxy)-N-butylethylamine hydrobromide, having a molecular weight of 383, is prepared by reacting $\beta$,2-dibromo-4-methoxyphenetole with butylamine.

2-(2,3,6-trichloro - 4 - methoxyphenoxy)-N-methyl-N-propylethylamine hydrobromide, having a molecular weight of 408 is prepared by reacting $\beta$-bromo-2,3,6-trichloro - 4 - methoxyphenetole with N-propyl-N-methylamine.

Example 2

$\beta$,2,6 - tribromo - 4 - hydroxyphenetole (22.0 grams, 0.059 mole) and 100 milliliters (0.48 mole) of 4.8 normal dimethylamine in methanol are mixed together and held for 48 hours at a temperature of 60° C. The reaction mixture is concentrated by evaporation under reduced pressure and the residue is dissolved in isopropanol. The alcoholic solution is treated with excess hydrogen chloride in isopropanol, cooled and filtered to obtain the product as a filter cake. The 3,5-dibromo-4-(2-dimethylaminoethoxy)phenol hydrochloride product is found to melt at 209°–210° C.

In substantially the same procedure, the following are prepared:

3,5-dichloro-4-(2 - dimethylaminoethoxy)phenol hydrochloride, melting at 196°–197° C., is prepared by reacting $\beta$-bromo-2,6-dichloro-4-hydroxyphenetole with dimethylamine.

3,5-dichloro-4-(3-dimethylaminopropoxy)phenol hydrochloride, melting at 203°–205° C., is prepared by reacting 3,5-dichloro-4-(3-bromopropoxy)phenol with dimethylamine.

3,5-dichloro-4-(4 - dimethylaminobutoxy)phenol hydrochloride, melting at 130–132° C., is prepared by reacting 3,5-dichloro - 4 - (4 - bromobutoxy)phenol with dimethylamine.

3,5-dibromo-4-(4-butylaminobutoxy)phenol hydrochloride, having a molecular weight of 432, is prepared by reacting 3,5-dibromo-4-(4-bromobutyl)phenol with butylamine.

3-bromo-4-(2-dimethylaminoethoxy)phenol hydrochloride, melting at 123°–124° C., is prepared by reacting $\beta$,2-dibromo-4-hydroxyphenetole with dimethylamine.

3,5-dibromo-4-(2 - dimethylaminoethoxy)phenol hydrobromide, melting at 241°–242° C., is prepared by reacting $\beta$,2,6 - tribromo - 4 - hydroxyphenetole with dimethylamine and treating the product with excess hydrogen bromide.

2,3,5-trichloro - 4 - (2-dimethylaminoethoxy)phenol hydrochloride, melting at 222°–224° C., is prepared by reacting $\beta$-bromo-2,3,6-trichloro-4-hydroxyphenetole with dimethylamine.

Example 3

Ventricular tachycardia is produced in dogs according to the method of Lucchesi and Hardman (J. Pharmacol. Exptl. Therap., 132, 372, 1961) by the administration of ouabain. In such operation, a dog is anesthetized by the intravenous administration of pentobarbital sodium at a dosage rate of 30 milligrams per kilogram. A femoral artery is cannulated with polyethylene tubing for measurements of blood pressure. A femoral vein is similarly cannulated for administration of ouabain and administration of the test compound. Hypodermic needle electrodes are employed for recording electrocardiograms. In such operations, ouabain is administered intravenously via the cannulated femoral vein at an initial dosage of 40 micrograms of ouabain per kilogram of animal body weight. The initial dosage of ouabain is supplemented after thirty minutes by 20 micrograms of ouabain per kilogram, and by 15 micrograms per kilogram thereafter until ventricular tachycardia is detected.

After ventricular tachycardia is observed, 2-(2-bromo-4-methoxyphenoxy) - N,N - dimethylethylamine hydrobromide is administered intravenously by administration of varying amounts of a composition comprising 50 milligrams of the substituted compound as a sterile solution in 10 milliliters of water containing 0.9 percent sodium chloride. Each dose is administered slowly over a period of 15 to 30 seconds. The compound is administered at an initial dosage rate of 0.25 milligram of 2-(2-bromo-4-methoxyphenoxy) - N,N - dimethylethylamine hydrobromide per kilogram of animal body weight. Blood pressure and electrocardiogram are observed for five minutes after administration. When a complete conversion from the arrhythmic condition to normal sinus (sinusoidal) rhythm is not observed within the five minute period, a second dose of 0.50 milligram of the test compound per kilogram is administered by a similar procedure and blood pressure and heartbeat are similarly observed for five minutes. When complete conversion of the ventricular tachycardia to normal sinus rhythm is not observed, the dosage is increased two-fold every five minutes until complete conversion is obtained. The animal is then observed and the duration of the period of normal cardiac rhythm produced by administration of the test compound is recorded as the duration of antiarrhythmic activity. The termination of the period of normal activity is marked by the reappearance of ventricular tachycardia or fibrillation as indicated by the electrocardiogram observations. The change in mean arterial blood pressure and the change in rate of heartbeats per minute produced by the administration of the recorded antiarrhythmic dosage of test compound sufficient to bring about a complete conversion of the ouabain-induced tachycardia is recorded.

In these operations, 2-(2-bromo-4-methoxyphenoxy)-N,N-dimethylethylamine hydrobromide is found to produce a complete conversion of ventricular tachycardia when administered intravenously at an antiarrhythmic dose of one milligram per kilogram. The duration of antiarrhythmic activity observed with such dosage rate is about 17 minutes. The administration of such antiarrhythmic dosage of the active compound is observed to produce an increase in mean arterial blood pressure of 37 millimeters of mercury and an increase in heartbeat rate of 12 beats per minute as compared to the blood pressure and heartbeat observed during the arrhythmatic condition prior to administration of the compound. Similar results have been observed with compounds known to be useful as antiarrhythmic agents. (Lucchesi et al., J. Pharmacol. Exptl. Therap., 132, 372, 1961).

Example 4

In other representative operations carried out by the procedure of Example 3, 3,5 - dichloro-4-(4-dimethylaminobutoxy)phenol hydrochloride is found to produce a complete conversion of ouabain-induced ventricular tachycardia in dogs when administered intravenously at an antiarrhythmic dose of 2 milligrams per kilogram. The duration of antiarrhythmic activity observed with such dosage rate is 20 seconds. The administration of such antiarrhythmic dosage of the active compound is observed to produce a decrease in mean arterial blood pressure of 40 millimeters of mercury and a decrease in heartbeat rate of 48 beats per minute as compared to the blood pressure and heartbeat observed during the arrhythmatic condition prior to administration of the compound. In further operations, complete conversion of arrhythmia for 1.25 minutes is obtained by intravenous administration of 4 milligrams of 3,5-dichloro-4-(4-dimethylaminobutoxy)phenol hydrochloride per kilogram.

Example 5

In other representative operations carried out by the procedure of Examples 3 and 4, 3,5-dichloro-4-(2-dimethylaminoethoxy)phenol hydrochloride is found to produce a complete conversion of ouabain-induced ventricular tachycardia in dogs when administered intravenously at an antiarrhythmic dose of 4 milligrams per kilogram. The duration of antiarrhythmic activity observed with such dosage rate is 142 seconds. The administration of such antiarrhythmic dosage of the active compound is observed to produce a decrease in mean arterial blood pressure of 20 millimeters of mercury and a decrease in heartbeat rate of 36 beats per minute as compared to the blood pressure and heartbeat observed during the arrhythmatic condition prior to administration of the compound.

In other operations, complete conversion of ouabain-induced ventricular tachycardia in dogs is obtained when 3,5 - dichloro - 4-(2-dimethylaminoethoxy)phenol hydrochloride is administered intravenously at a dosage of 2 milligrams per kilogram. The duration of antiarrhythmic activity observed with such dosage rate is 62 seconds. The administration of such antiarrhythmic dosage of the active compound is observed to produce an increase in mean, arterial blood pressure of 3 millimeters of mercury and a decrease in heartbeat rate of 24 beats per minute as compared to the blood pressure and heartbeat observed during the arrhythmatic condition prior to administration of the compound.

Example 6

In other operations carried out by the procedure of the preceding examples, 2,3,5-trichloro-4-(2-dimethylaminoethoxy)phenol hydrochloride is found to produce a complete conversion of ouabain-induced ventricular tachycardia in dogs when administered intravenously in an antiarrhythmic dose of 8 milligrams per kilogram. The duration of antiarrhythmic activity observed with such dosage rate is 47 seconds.

Example 7

Eight grams of 2-(2,3,5-tribromo-4-methoxyphenoxy)-N-methylethylamine citrate, eight grams of 2-(2-chloro-4 - methoxyphenoxy) - N,N-dimethylethylamine and four grams of 3,5 - dichloro - 4 - (3-dimethylaminopropoxy)-phenol are mixed together with 3 grams of sodium lauryl sulfate. The resulting mixture is mixed well with 60 grams of dextrose and 17 grams of corn starch in conventional mixing apparatus. The mixture is filled into gelatin capsules in the amount of 0.4 gram per capsule. The capsules are thus adapted to provide a maintenance antiarrhythmic dosage of 80 milligrams of the active ingredient to arrhythmic mammals.

150 grams of 3-bromo-4-(2-dimethylaminoethoxy) phenol hydrobromide are intimately mixed with 50 grams of magnesium stearate, 305 grams of gum acacia and 1145 grams of corn starch and the mixture is compressed into slugs. The slugs are broken into granules which are passed through a twelve to fourteen mesh screen and mixed with an additional 50 grams of magnesium stearate. The mixture is then compressed into tablets weighing 0.55 gram each. The tablets are administrated orally to animals to combat arrhythmias.

Example 8

25 grams of 3,5-dichloro-4-(4-dimethylaminobutoxy)-phenol hydrobromide are dissolved in 1000 milliliters of water containing 0.5 percent hydroxypropylmethyl cellulose, 0.01 percent benzethonium chloride, and 0.9 percent sodium chloride. The mixture is filtered, poured into vials, sealed and sterilized. Intravenous injection of ten cubic centimeters of this composition to an arrhythmic mammal provides a dosage of 25 milligrams of the active ingredient.

Seven grams of 2-(2-bromo-4-methoxyphenoxy)-N,N-dimethylethylamine hydrochloride are dissolved in 100 cubic centimeters of normal saline solution containing 0.5 percent of chlorobutanol as a preservative. The solution is filtered, filled into vials, seals and sterilized in an autoclave to obtain a steril injectable composition. One cubic centimeter of the composition contains about 70 milligrams of the active ingredient. The composition is administered to animals exhibiting cardiac arrhythmia.

What is claimed is:

1. The method which comprises administering internally to a cardiac arrhythmic mammal an antiarrhythmic amount of a substituted phenol compound or a pharmaceutically-acceptable salt thereof, the compound corresponding to the formula

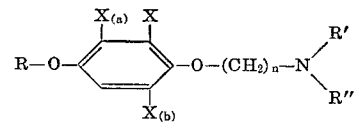

wherein R represents hydrogen or methyl, X represents chlorine or bromine, R' represents hydrogen, methyl, ethyl, propyl or butyl, R" represents methyl, ethyl, propyl or butyl, $n$ represents one of the integers 2, 3 and 4 and $a$ and $b$ each independently represent one of the integers zero and one.

2. The method of claim 1 wherein $a$ represents zero when $b$ represents zero.

3. The method of claim 1 wherein R' and R" both represent methyl.

4. The method of claim 1 wherein X represents bromine.

5. The method of claim 1 wherein R, R' and R" represent methyl, $n$ is 2, and $a$ and $b$ are both zero.

6. The method of claim 1 wherein $n$ is 2.

7. A composition useful for administration to animals in alleviating cardiac arrhythmias comprising a pharmacutical carrier having incorporated therein an amount of from about 2 to about 95 percent of a substituted phenol compound or a pharmaceutically-acceptable salt thereof, the compound corresponding to the formula

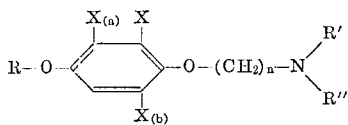

wherein R represents hydrogen or methyl, X represents chlorine or bromine, R' represents hydrogen, methyl, ethyl, propyl or butyl, R" represents methyl, ethyl, propyl or butyl, $n$ represents one of the integers 2, 3 and 4 and $a$ and $b$ each independently represent one of the integers zero and one.

8. The composition of claim 7 wherein $a$ represents zero when $b$ represents zero.

9. The composition of claim 8 wherein R' and R" both represent methyl.

10. The composition of claim 9 wherein R represents methyl.

References Cited

UNITED STATES PATENTS

| | | | |
|---|---|---|---|
| 3,205,136 | 9/1965 | Tedeschi | 424—330 |
| 3,337,628 | 8/1967 | Crowther et al. | 260—570.7 |
| 3,389,171 | 6/1968 | White et al. | 260—501.17 |
| 3,419,591 | 12/1968 | Harrison | 260—440 |

ALBERT T. MEYERS, Primary Examiner

D. M. STEPHENS, Assistant Examiner

U.S. Cl. X.R.

260—570.7